(12) United States Patent
Schmidt et al.

(10) Patent No.: US 11,745,327 B2
(45) Date of Patent: Sep. 5, 2023

(54) SELF-ALIGNING TOOL GUIDE

(71) Applicant: Hilti Aktiengesellschaft, Schaan (LI)

(72) Inventors: Peer Schmidt, Lindau (DE); Dario Bralla, Buchs (CH); Serhey Khandozhko, Buchs SG (CH)

(73) Assignee: Hilti Aktiengesellschaft, Schaan (LI)

( * ) Notice: Subject to any disclaimer, the term of this patent is extended or adjusted under 35 U.S.C. 154(b) by 305 days.

(21) Appl. No.: 16/766,609

(22) PCT Filed: Oct. 31, 2018

(86) PCT No.: PCT/EP2018/079789
§ 371 (c)(1),
(2) Date: May 22, 2020

(87) PCT Pub. No.: WO2019/101481
PCT Pub. Date: May 31, 2019

(65) Prior Publication Data
US 2021/0001472 A1    Jan. 7, 2021

(30) Foreign Application Priority Data
Nov. 23, 2017 (EP) ..................................... 17203218

(51) Int. Cl.
*B25H 1/00* (2006.01)
*B60L 50/60* (2019.01)
(Continued)

(52) U.S. Cl.
CPC ............ *B25H 1/0028* (2013.01); *B25D 17/32* (2013.01); *B25H 1/0035* (2013.01); *B60L 7/003* (2013.01);
(Continued)

(58) Field of Classification Search
CPC ............................... B60L 50/66; B60H 1/0028
See application file for complete search history.

(56) References Cited

U.S. PATENT DOCUMENTS 2,872,200 A    2/1959  Kroll
3,825,075 A    7/1974  Mee
(Continued)

FOREIGN PATENT DOCUMENTS

CA    2 841 506 A1    8/2015
CN    104959651 A     10/2015
(Continued)

OTHER PUBLICATIONS

PCT/EP2018/079789, International Search Report dated Dec. 17, 2018 (Three (3) pages).
(Continued)

*Primary Examiner* — Jess Whittington
(74) *Attorney, Agent, or Firm* — Crowell & Moring LLP

(57) ABSTRACT

A tool guide has a mounting, a lifting mechanism, and a chassis. The mounting is for fixing a hand-held machine tool. The mounting is mounted on the lifting mechanism. The lifting mechanism has a propulsion unit for vertically lifting the mounting. The chassis has two wheels on a wheel axle, a drive coupled with the wheels, and a steering system. The lifting mechanism is rigidly mounted on the chassis. A center of gravity sensor is arranged to detect a lateral deflection of the center of gravity of the lifting mechanism relative to the wheel axle. The steering system is configured to control the drive to deliver a torque counteracting the lateral deflection.

10 Claims, 5 Drawing Sheets

(51) Int. Cl.
  *B25D 17/32* (2006.01)
  *B60L 15/20* (2006.01)
  *B60L 7/00* (2006.01)

(52) U.S. Cl.
  CPC .............. *B60L 15/20* (2013.01); *B60L 50/66* (2019.02); *B60L 2200/16* (2013.01); *B60L 2200/40* (2013.01); *B60L 2240/421* (2013.01); *B60L 2240/423* (2013.01); *B60L 2260/34* (2013.01)

(56) References Cited

U.S. PATENT DOCUMENTS

| | | | |
|---|---|---|---|
| 4,757,971 | A | 7/1988 | Mapes |
| 4,790,548 | A | 12/1988 | Decelles et al. |
| 5,137,235 | A | 8/1992 | Wentworth et al. |
| 5,794,721 | A | 8/1998 | Clonch et al. |
| 5,820,317 | A | 10/1998 | Van Troba |
| 6,915,878 | B2* | 7/2005 | Kamen ............... A61G 5/14 180/7.1 |
| 8,442,661 | B1* | 5/2013 | Blackwell ............ B25J 5/007 700/62 |
| 8,788,096 | B1* | 7/2014 | Sokol ............... B25J 19/023 280/298 |
| 9,278,736 | B2 | 3/2016 | Van Der Tempel et al. |
| 9,506,345 | B2 | 11/2016 | Vogel et al. |
| 9,747,480 | B2 | 8/2017 | McAllister |
| 9,789,412 | B2 | 10/2017 | Mainville |
| 10,283,008 | B2 | 5/2019 | Vatcher et al. |
| 10,634,718 | B2 | 4/2020 | Baer et al. |
| 2004/0007425 | A1 | 1/2004 | Kamen et al. |
| 2004/0240952 | A1 | 12/2004 | Perry |
| 2008/0147281 | A1 | 6/2008 | Ishii et al. |
| 2009/0055033 | A1 | 2/2009 | Gansler et al. |
| 2009/0078485 | A1* | 3/2009 | Gutsch ............... E01H 5/04 37/246 |
| 2009/0271058 | A1 | 10/2009 | Chilson |
| 2010/0114468 | A1* | 5/2010 | Field ............... B62J 17/08 701/124 |
| 2010/0174476 | A1 | 7/2010 | Fuwa |
| 2011/0071677 | A1 | 3/2011 | Stilman |
| 2011/0318124 | A1 | 12/2011 | Blatz |
| 2014/0042292 | A1 | 2/2014 | Buchner |
| 2014/0069733 | A1 | 3/2014 | Kahlert et al. |
| 2014/0277847 | A1* | 9/2014 | Cann ............... B60L 15/2036 701/2 |
| 2015/0060162 | A1 | 3/2015 | Goffer |
| 2016/0263738 | A1 | 9/2016 | May |
| 2017/0094144 | A1 | 3/2017 | Tomomasa et al. |
| 2017/0157727 | A1 | 6/2017 | Felton et al. |
| 2017/0182646 | A1 | 6/2017 | Merello |
| 2017/0259811 | A1* | 9/2017 | Coulter ............... B60W 10/20 |
| 2018/0326507 | A1 | 11/2018 | Halvorsen et al. |
| 2020/0109937 | A1 | 4/2020 | Zweigle et al. |
| 2020/0132466 | A1* | 4/2020 | MacNeille ............ G05D 1/027 |
| 2020/0346340 | A1 | 11/2020 | Schmidt et al. |
| 2021/0001472 | A1 | 1/2021 | Schmidt et al. |
| 2021/0072751 | A1* | 3/2021 | Gillett ............... B60K 7/0007 |
| 2021/0162579 | A1 | 6/2021 | Schmidt et al. |
| 2021/0229254 | A1 | 7/2021 | Merello |
| 2021/0402538 | A1 | 12/2021 | Martinez et al. |
| 2022/0113799 | A1* | 4/2022 | Schorey ............... G06F 3/011 |
| 2022/0184790 | A1 | 6/2022 | Schmidt et al. |
| 2022/0184797 | A1 | 6/2022 | Bangalore Srinivas et al. |
| 2022/0197306 | A1* | 6/2022 | Cella ............... G05D 1/0297 |

FOREIGN PATENT DOCUMENTS

| | | | |
|---|---|---|---|
| DE | 33 28 582 A | | 3/1984 |
| DE | 297 09 281 | | 1/1998 |
| DE | 10 2007 000 253 A1 | | 11/2008 |
| DE | 10 2012 009 863 A1 | | 11/2013 |
| FR | 2 446 155 A1 | | 8/1980 |
| JP | 6-108662 A | | 4/1994 |
| JP | 6-182677 A | | 7/1994 |
| JP | 6-307076 A | | 11/1994 |
| WO | WO 2016/066615 A2 | | 5/2016 |
| WO | WO 2021/094218 A1 | | 5/2021 |

OTHER PUBLICATIONS

Segway Inc., "User Manual—Segway Personal Transporter", 2014, XP002780951 (Five (5) pages).

U.S. Patent Application, "Self-Aligning Tool Guide", filed May 22, 2020, Inventor: Peer Schmidt et al.

* cited by examiner

SELF-ALIGNING TOOL GUIDE

CROSS REFERENCE TO RELATED APPLICATIONS

This application claims the priority of International Application No. PCT/EP2018/079789 filed Oct. 31, 2018, and European Patent Document No. 17203218.7, filed Nov. 23, 2017, the entire disclosures of which are expressly incorporated by reference herein.

BACKGROUND AND SUMMARY OF THE INVENTION

The invention relates to a self-aligning tool guide and a control method for the tool guide.

Suspended ceilings are a common design element in large buildings, especially in industrial and office buildings. Technical installations, such as electrical installations, ventilation systems, lighting and sound insulation, can be laid between the ceiling of the shell construction and the suspended ceiling and are accessible for subsequent inspection and maintenance. Load-bearing substructures of the installations and the suspended ceiling are fixed with dowels, screws or similar elements anchored in the ceiling of the shell construction. To build the suspended ceiling, holes are drilled in the ceiling of the shell, in which the dowels can be used or the screws can be screwed. A lateral position of the holes is predetermined by the supporting substructure.

Drilling the holes is time consuming. The user can reach the high-hanging ceiling of the shell construction only with a ladder or scaffolding. The ladder must be placed below the predetermined position, the user climbs up the ladder, drills the hole, descends the ladder, and shifts the ladder to the next position.

DE 33 28 582 A1 describes a mobile ceiling drilling and mounting device for the installation of knock-in anchors in a ceiling. The ceiling drill is based on an impact drill, which is mounted on a telescopic column. The telescopic column is suspended oscillating on a trolley. The user can drive the ceiling drill below a desired location, apply the impact drill to the ceiling by means of the column and drill a hole in the ceiling. The impact drill can be controlled via a control cabinet. For transporting over stairwells, the device must be divided into four parts—carriage, telescopic column, impact drill and control cabinet.

An embodiment of the invention relates to a self-aligning tool guide. The tool guide has a mounting, a lifting mechanism and a chassis. The mounting is for fixing a hand-held machine tool. The mounting is mounted on the lifting mechanism. The lifting mechanism has a propulsion unit for vertical lifting of the mounting. The chassis has two wheels on a wheel axle, a drive coupled with the wheels and a steering system. The lifting mechanism is rigidly mounted on the chassis. A center of gravity sensor is arranged to detect a lateral deflection of the center of gravity of the lifting mechanism relative to the wheel axle. The steering system is arranged to control the drive to deliver a torque counteracting the deflection.

The self-aligning tool guide allows for a very compact and lightweight design by reducing the number of assemblies. The dynamic stabilization enables a stable footing of the tool guide already on one wheel or on two wheels.

The axis of the tool is aligned by the drive control and wheels. In a deflection of the tool from the predetermined direction, the wheels actively exert a counter-torque, which aligns the tool correctly again. This is especially necessary when applying the tool to the ceiling. Both floor and ceiling of a shell are wavy and inclined to the horizontal, whereby lateral forces act on the tool. A freely oscillating tool would avoid the lateral forces by a deflection and thus lead to a misalignment of the tool.

An embodiment of the invention includes a mounting for fixing a hand-held machine tool, a lifting mechanism and a self-balancing chassis. On the lifting mechanism, a mounting is mounted, which can be raised and lowered parallel to a lifting axis with a propulsion unit of the lifting mechanism. The self-balancing chassis has two wheels on a wheel axle and a drive coupled to the wheels. The lifting mechanism is rigidly mounted on the chassis. An inclination sensor detects an inclination of a wheel axle of the chassis with respect to a horizontal plane. A steering system has a mode S9 in which the steering system turns the chassis by means of the drive around a vertical axis until the inclination is zero. The tool guide also has a center of gravity sensor for detecting a lateral deflection x of the center of gravity G relative to the wheel axle. The steering system is set up to deliver a torque counteracting the deflection.

For the tool guide standing only on two wheels, there is always a position in which the wheel axle can be aligned parallel to the horizontal, solely by rotating about the vertical axis. In a system with three or more wheels, the lifting mechanism must be mounted pivotably relative to the wheel axes.

An embodiment of the self-aligning tool guide according to the invention has a mounting for fixing a hand-held machine tool for machining a ceiling, a lifting mechanism, and a self-balancing chassis. The mounting is mounted on the lifting mechanism. The lifting mechanism has a propulsion unit for lifting the mounting parallel to a lifting axis. The self-balancing chassis has two wheels on a wheel axle, a drive coupled to the wheels, and a steering system. A sensor is used to detect a contact force of the mounting, which acts in the direction of gravity. The control station controls the propulsion unit depending on the detected contact pressure.

An embodiment of the self-aligning tool guide according to the invention has a mounting for fixing a hand-held machine tool for machining a ceiling, a lifting mechanism, and a self-balancing chassis. The mounting is mounted on the lifting mechanism. The lifting mechanism has a propulsion unit for lifting the mounting parallel to a lifting axis. The self-balancing chassis has two wheels on a wheel axle, a drive coupled to the wheels, and a steering system. A contact sensor is used to detect an indirect contact of the mounting with the ceiling. The chassis has a brake. The controller has a mode S9 in which the brake is activated and the balancing of the self-balancing chassis is deactivated.

The tool guide usually touches the ground only with the two wheels. An upright standing position is only ensured by the balancing of the chassis. When machining the ceiling, a third point of contact results, which may be sufficient for an upright standing position without balancing. The static standing position without balancing can be an advantage when machining the ceiling. The brake supports the stability.

An embodiment of the self-aligning tool guide according to the invention has a mounting for fixing a hand-held machine tool, a lifting mechanism and a self-balancing chassis. The mounting is mounted on the lifting mechanism. A propulsion unit serves to lift the mounting parallel to a lifting axis. A control station is operated by a user to operate the propulsion unit. The self-balancing chassis has two wheels on a wheel axle, a drive coupled to the wheels, and a steering system for operating the chassis by a user. An array of electric batteries is used to power the propulsion unit and drive. An emergency power device has a charge level sensor for determining a charge level of the array of electric batteries. A deactivation unit deactivates the control station in response to an undershooting of an emergency charge by the control station.

The tool guide has its own power supply. The power supply is available for the operation of the lifting mechanism, possibly of the hand-held machine tool, but also of the chassis. When the battery level is low, the user is emphatically prompted to charge or replace the batteries by disabling the control station and thus the lifting mechanism and hand-held machine tool. This avoids the tool guide falling over due to empty batteries and as a result of a failure of balancing.

The following description explains the invention with reference to exemplary embodiments and figures.

DETAILED DESCRIPTION OF THE DRAWINGS

Figure 1:
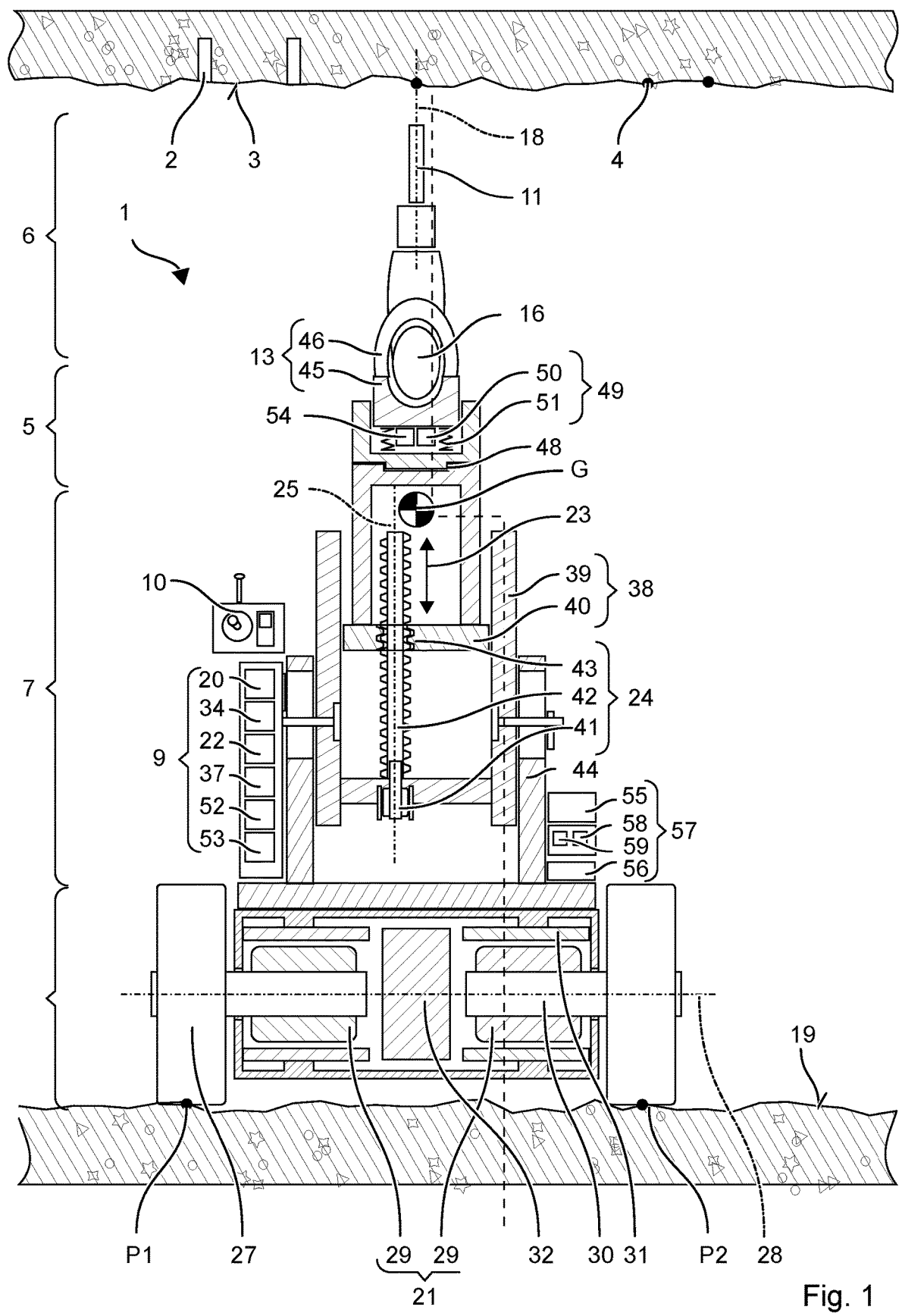
FIG. 1 shows a self-aligning tool guide from the front.

Identical or functionally identical elements are indicated by the same reference numerals in the figures, unless stated otherwise. Vertical, in the context of this description, denotes a direction parallel to gravity; horizontal denotes a direction or plane perpendicular to gravity.

Figure 2:
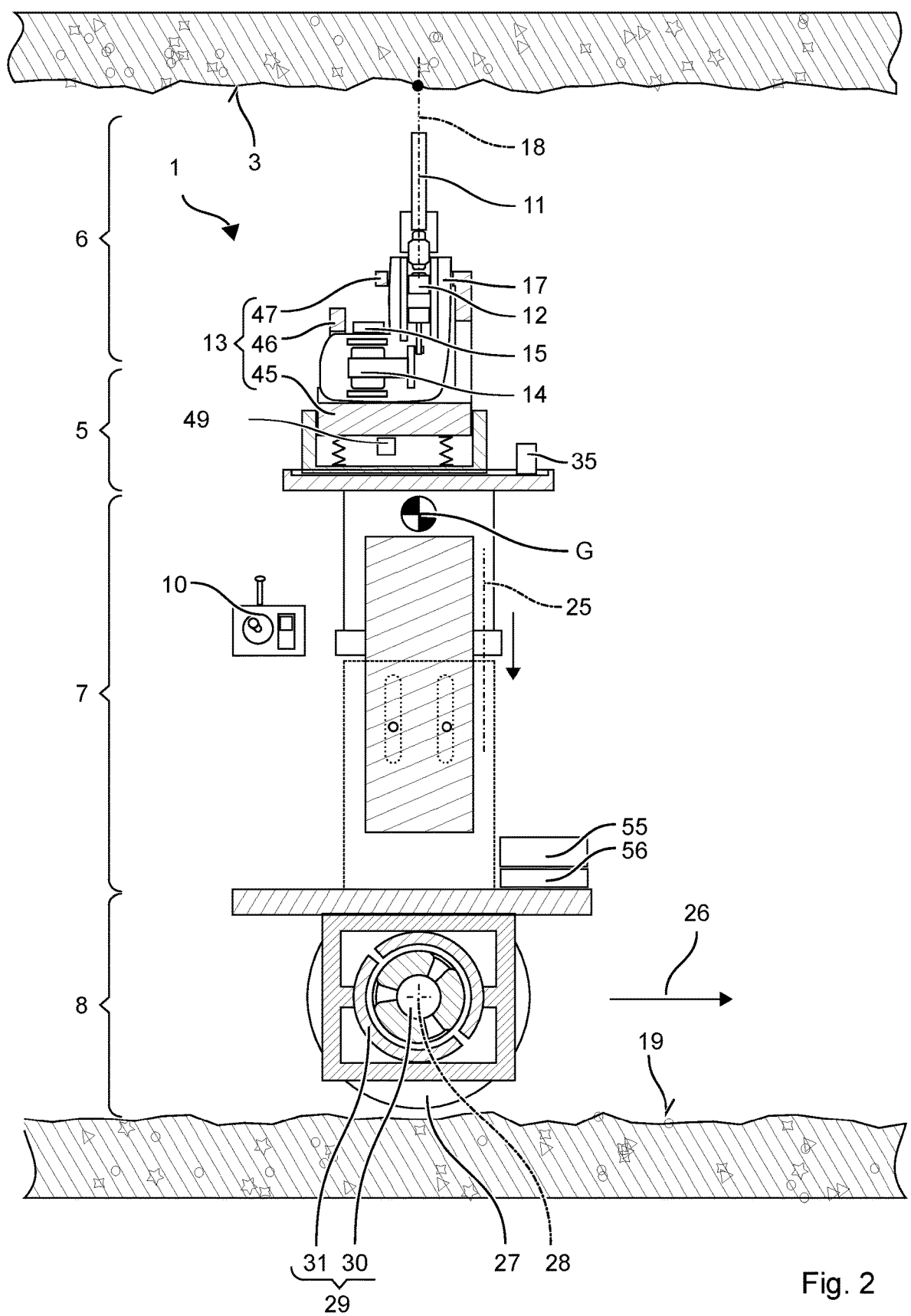
FIG. 2 shows a self-aligning tool guide in a sectional view I-I.
Figure 3:
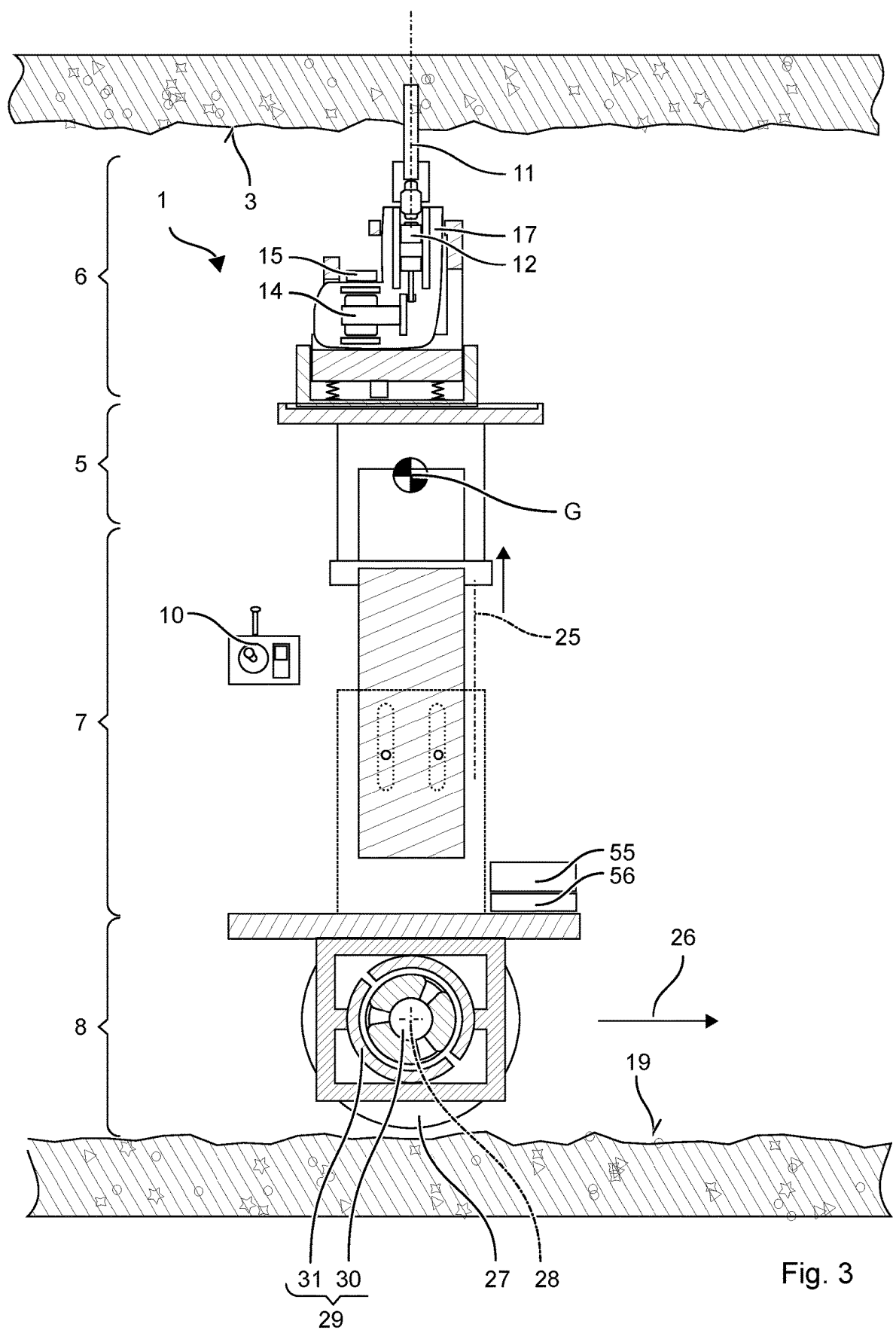
FIG. 3 shows a self-aligning tool guide when machining a ceiling in a sectional view II.
Figure 4:
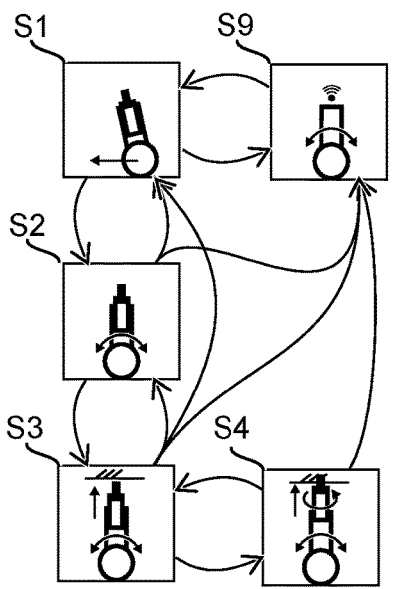
FIG. 4 shows a status diagram.
Figure 9:
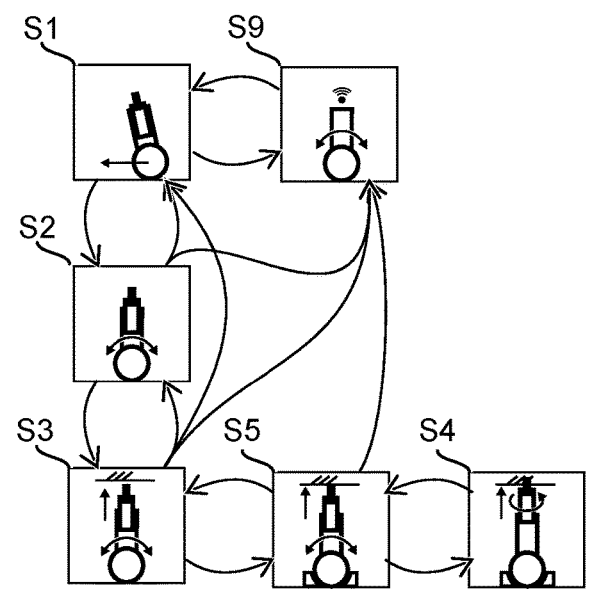
FIG. 9 shows a status diagram.
Figure 5:
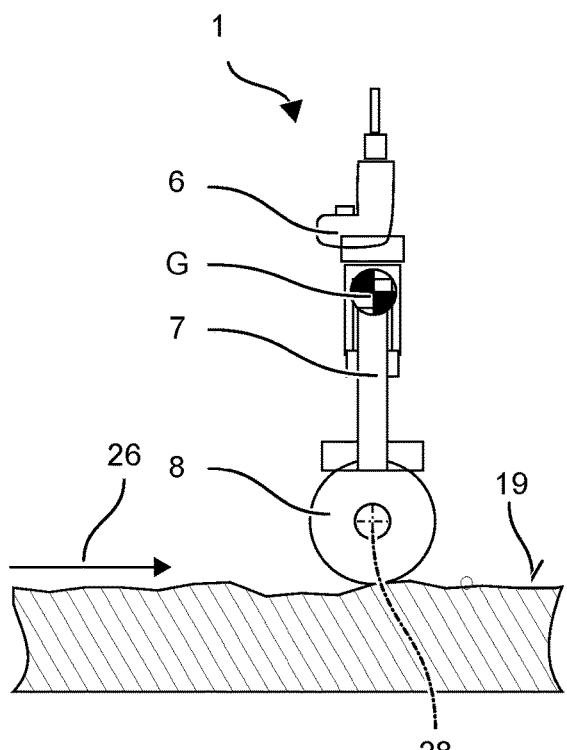
FIG. 5 shows a diagram explaining the alignment (equilibrium)
Figure 6:
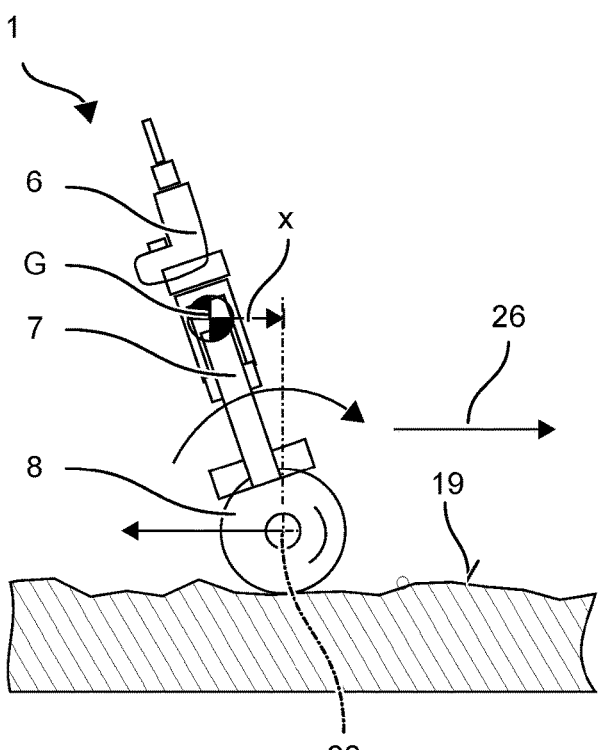
FIG. 6 shows a diagram explaining the alignment in the forward/backward direction.
Figure 7:
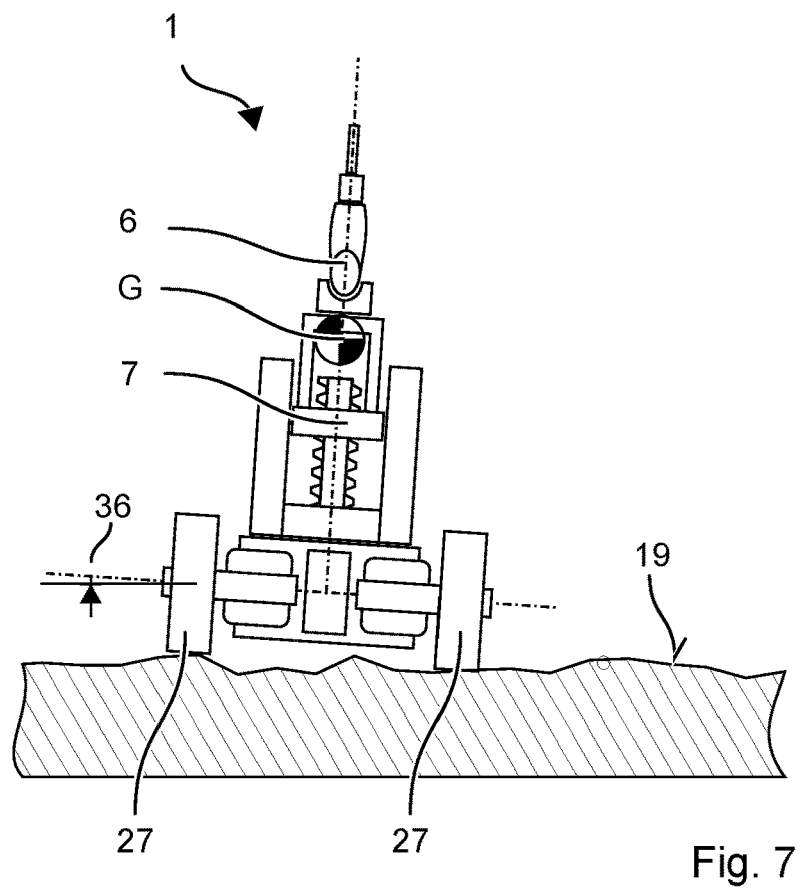
FIG. 7 shows a diagram explaining the alignment in the transverse direction.
Figure 8:
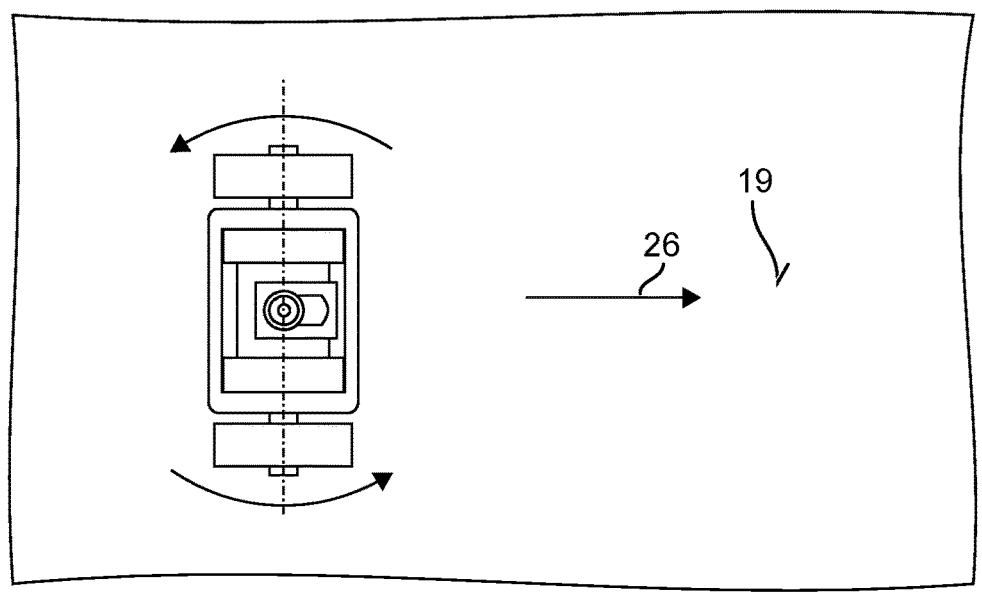
FIG. 8 shows a diagram explaining the alignment in the transverse direction.

FIG. 1 and FIG. 2 show an exemplary self-aligning tool guide 1 for installation work in a shell construction. An assembly of a ventilation pipe requires, for example, several holes 2 in a ceiling 3 of the shell construction. The holes 2 should lie at predetermined positions 4, e.g., in alignment. Furthermore, the holes 2 should be parallel to each other, for example oriented vertically. Position 4 is entered in a plan, for example. A foreman can mark the position 4 by color markings on the ceiling 3 of the shell construction. Other installation work on the ceiling 3 may include setting nails, driving in screws, grinding, etc.

FIG. 1 and FIG. 2 schematically show an embodiment of the self-aligning tool guide 1 The tool guide 1 has a mounting 5 for a hand-held machine tool 6, a motorized lifting mechanism 7, a motorized chassis 8, a controller 9 and a console 10.

The user can set up the tool guide 1 with a suitable hand-held machine tool 6 and a suitable tool 11 according to the application. For drilling holes 2 in a shell construction this would be, for example, an impact drill with a hammer mechanism 12 and a drill with a sintered carbide tip. The hand-held machine tool 6 can be used in the mounting 5 on the lifting mechanism 7. A lock 13 secures the hand-held machine tool 6 in the mounting 5. The lock 13 is preferably releasable without tools. In other embodiments, the power tool with the mounting may be 5 be permanently connected, for example, it may be screwed.

The impact drill is just one example of a hand-held machine tool 6. Other examples are an electric screwdriver, a nail setter, an angle grinder, a glue gun, a paint spray gun, etc. One type of hand-held machine tool 6 drives a replaceable tool 11 e.g., the drill, a chisel, a screwdriver bit, a cutting disc, etc. for its function. Another type of hand-held machine tool 6 directly processes a consumable, e.g., nails, screws, paint, glue. The hand-held machine tools 6 are characterized by an own drive, with which the tool 11 is driven or the consumable is driven or applied. The user does not have to apply manual force for the use of the hand-held machine tool 6. The hand-held machine tools are referred to as power tools. The power source 14 may be electric or fuel-driven. Examples are an electric motor, an electric pump, a gas-fed combustion chamber, a powder-driven piston, etc. The power source 14 is coupled to a (trigger) button 15. When the trigger button 15 is pressed, the power source 14 is activated. The trigger button 15 is preferably remotely triggered or locked.

The hand-held machine tool 6 may be a commercially available hand-held machine tool 6. The hand-held machine tool 6 has a handle 16 and typically a housing portion 17 for fastening an additional handle. The hand-held machine tool 6 may be formed without a handle. The mounting 5 may also be designed for non-handheld machine tools.

The hand-held machine tool 6 has a working axis 18 defined by its structure A tip of the tool 11 or a tip of the consumable lies on the working axis 18 The tip is moved along the working axis 18. The tip first touches the surface to be machined, e.g., the ceiling 3.

A status diagram of the tool guide 1 is shown in [0020]. The user activates the tool guide 1 by means of the console 10. The chassis 8 is in a (driving) mode S1 in which the user can move the tool guide 1 through the room on the floor 19. The controller 9 activates a steering system 20 of the tool guide 1. The user can set the direction of travel and speed via the console 10. The user steers the tool guide 1 to one of the marked positions 4. The chassis 8 has a drive 21 which moves the chassis 8 over the ground 19 on its own power. Direction and speed of movement of the chassis 8 are controlled by the steering system 20 of the tool guide 1. The steering system 20 processes, inter alia, the entered specifications for speed and direction via the console 10.

At the marked position 4 the user stops the tool guide 1. Via the console 10, the user puts the chassis 8 in a (standing) mode S2. The controller 9 locks the steering system 20 for the user or deactivates the steering system 20. The steering system 20 ignores specifications for speed and direction of travel via the console 10. The tool guide 1 remains in the currently occupied position 4. The steering system 20 can detect the current position 4. If the chassis 8 leaves the current position 4 or is shifted from this, the steering system 20 automatically generates control signals to drive the chassis 8 back to the detected position 4.

The user can activate a (lifting) mode S3 via the console 10 in order to lift the hand-held machine tool 6 with the lifting mechanism 7. The controller 9 forces the standing mode S2 for the chassis 8 before the lift mode can be activated. The controller 9 can delay the activation of the lift mode until the chassis 8 is stationary. In the lifting mode, a control station 22 is enabled or activated for the user. The user can specify movement direction 23 i.e., up or down, lifting speed and position of the lifting mechanism 7 via the console 10. The mounting 5 is moved by the lifting mechanism 7 accordingly. The control station 22 controls a propulsion unit 24 of the lifting mechanism 7, taking into account the predetermined vertical direction of movement and lifting speed specified via the console 10. The lifting mechanism 7 raises or lowers the mounting 5 and, optionally, the hand-held machine tool 6 inserted therein, along a fixed lifting axis 25. The lifting mechanism 7 is limited to a single-axis, translational motion on the lifting axis 25.

The working axis 18 of the hand-held machine tool 6 is parallel to the lifting axis 25. In one embodiment, the construction of the mounting 5 forces the parallel alignment. The hand-held machine tool 6 can be used, for example, due to a fit of the mounting 5 to a housing of the hand-held machine tool 6, in only one defined manner in the mounting 5. In one embodiment, the mounting 5 can be pivoted about the (pivot) axis 25 inclined to the lifting axis, in order to align the alignment of the work axis 18 to the lifting axis 25.

An alignment of the lifting axis 25 and thus the working axis 18 relative to the ceiling 3 is done dynamically by the chassis 8. The chassis 8 aligns the lifting axis 25 vertically, i.e., parallel to gravity.

The hand-held machine tool 6 can preferably switch on the control console 22. The tool 11 can machine the ceiling 3, for example, drill a hole 2. The controller 9 may have a (machining) mode S4, which automatically controls the propulsion unit 24 of the lifting mechanism 7 during the work on the ceiling 3. The machining mode can be activated manually, for example, on the console 10. In the processing mode, the control station 22 adapts the lifting speed of the lifting mechanism 7 to a machining progress of the tool 11. The lifting mechanism 7 and the tool 11 can be protected from excessive loads. A machining target, e.g., a hole depth, can be specified on the control station 22. After reaching the machining target, the control console 22 can automatically stop the propulsion unit 24. In addition, the control console 22 can automatically lower the lifting mechanism 7 so far that the tool 11 is out of engagement with the ceiling 3.

The user can now move the tool guide 1 to a next marked position 4. The user switches the tool guide 1 into the driving mode S1. The control station 22 is locked for the user. The hand-held machine tool 6 is forcibly turned off. The tool guide 1 can check before starting whether the tool 11 is still in engagement with the ceiling 3. For example, the steering system 20 moves the chassis 8 by a small predetermined distance in a direction 26 and checks whether a counteracting torque acts on the chassis 8. The steering system 20 moves the chassis 8 back to the previous position 4, changes to the standing mode and causes the control station 22 to lower the lifting mechanism 7.

The chassis 8 has two wheels 27 coupled with the drive 21. The two wheels 27 are arranged mutually offset on a transverse axis or wheel axle 28. The wheel axle 28 extends through the middle of the two wheels 27. The wheels 27 may be parallel to each other; or the wheels 27 are inclined by a few degrees to each other due to a camber and/or a toe angle. The two wheels 27 essentially rotate about the wheel axle 28. Each of the wheels 27 is coupled to the drive 21. The drive 21 may include two electric motors 29, for example. The wheels 27 each sit directly on a rotor 30, one of the electric motors 29. Alternatively, the wheels 27 may be coupled via clutches and gears to a central electric motor 29. The drive 21 exerts on the wheels 27 a torque acting around the wheel axle 28. The rotationally driven wheels 27 move the chassis 8 over the ground 19. The chassis 8 moves straight ahead when the two wheels 27 rotate at the same speed. The wheels 27 can be driven individually by the drive 21. Different torque and different speed of the wheels 27 cause the chassis 8 to drive around a bend. Preferably, the wheels 27 can be driven in opposite directions to rotate the chassis 8 about its vertical axis. The drive 21 receives control signals for speed and torque of the two wheels 27 from the steering system 20. The steering system 20 generates the control signals in response to predetermined steering movements, e.g., to the steering movements specified by the user. The drive 21 may have a sensor for detecting the output torque and speed of the wheels 27. The acquired measurement data can be transmitted to the steering system 20 in order to correct the deviations from the steering movement.

The chassis 8 and the tool guide 1 are on the floor 19 only with the two wheels 27. The two points of contact P1 P2 are on a line parallel to the wheel axle 28. For a statically stable state, there is no third point of contact with the ground 19 outside the line. The tool guide 1 would fall over without a countermeasure. The steering system 20 achieves a dynamic equilibrium by permanently balancing the center of gravity G of the lifting mechanism 7. Based on detection of the center of gravity G, the steering system 20 controls the drive 21 to generate a counteracting torque.

The lifting mechanism 7 is mounted on the chassis 8. The lifting mechanism 7 is stationary relative to the chassis 8, in particular, the lifting mechanism 7 is immovable with respect to the drive 21 and the wheel axle 28. The lifting mechanism 7 is preferably rigidly connected to a stator 31 of the drive 21. The drive 21 generates a torque and a retroactive torque of the same size and opposite direction of rotation in pairs. The torque acts on the wheels 27 via the rotor 30 of the drive 21. The retroactive torque acts via the stator 31 of the drive 21 on the lifting mechanism 7.

The weight of the tool guide 1 is composed of the weight of the chassis 8 and the weight of the lifting mechanism 7 together. The weight of the hand-held machine tool 6 is, to simplify, added to the weight of the lifting mechanism 7. The center of gravity of the chassis 8 is approximately on the wheel axle 28. The wheels 27 the drive 21 and batteries 32 are arranged symmetrically about the wheel axle 28. The center of gravity G of the lifting mechanism 7 is above the wheel axle 28. The tool guide 1 stands, albeit only metastable, if the center of gravity G is vertically above the wheel axle 28 (equilibrium, [0021]). A lateral deflection x is equal to zero. The tool guide 1 falls when the center of gravity G is offset from the wheel axle 28 in the lateral direction 33, i.e., the lateral deflection x is not equal to zero ([0022]).

The steering system 20 has a (center of gravity) sensor 34 for detecting the lateral deflection x of the center of gravity G of the lifting mechanism 7. The lateral deflection x of the center of gravity G out of equilibrium results in various measurable variables. The lifting mechanism 7 is inclined to gravity; the center of gravity sensor 34 may accordingly include an inclination sensor. The falling movement leads to a characteristic acceleration; the center of gravity sensor 34 may include a gyro sensor, an acceleration sensor, a yaw rate sensor, etc. for determining speed, acceleration, yaw rate and/or rotational movement about the wheel axle 28. The inclined lifting mechanism 7 exerts a torque on the drive 21; the center of gravity sensor 34 may include a torque sensor, a force sensor, etc. for detecting a torque, a non-vertical force, etc. The sensors can detect the quantities listed above based on mechanical, optical, magnetic or electrical effects.

The steering wheel 20 includes a control sequence, which determines a torque for erecting the lifting mechanism 7 based on the deflection x. For example, the steering system 20 may specify a torque proportional to the deflection x. The steering system 20 transmits the torque in the form of a control signal to the drive 21 which generates the torque.

The control sequence may include a control loop that adjusts the deflection x to zero. Control parameters, such as the gain factor and the integral component, are preferably adaptable, for example, in order to adapt the control sequence to the different weight of the hand-held machine tools 6.

The lifting mechanism 7 is vertically aligned by the engine power of the drive 21. Due to disturbances of the equilibrium, the lifting mechanism 7 can oscillate several times about the vertical alignment in response to the control process. After oscillating, no movement is visible to the user. The torque acting on the lifting mechanism 7 is opposed by the torque acting on the wheels 27. The wheels 27 rotate accordingly, causing the chassis 8 to move in the direction 26 of the deflection x ([0022]). The chassis 8 oscillates analogously to the lifting mechanism 7 about a middle position. Friction and grip of the wheels 27 on the ground 19 damp the oscillating.

The statically unstable position of the chassis 8 and the balancing are used to align the lifting axis 25 vertically. In the dynamic equilibrium, the center of gravity G lies vertically above the wheel axle 28. The lifting mechanism 7 is, relative to the wheel axle 28, arranged such that a line passing through the center of gravity G and the wheel axle 28, is parallel to the lifting axis 25. The exemplary lifting mechanism 7 has a balance weight 35 on the mounting 5 to adjust the position 4 of the center of gravity G for different hand-held machine tools 6. The balance weight 35 can be locked at different distances from the lifting axis 25. Instead of a balance weight 35, the control can adjust the deflection x to a predetermined offset. The offset preferably takes into account the placing position of the lifting mechanism 7. Regardless of the height of the lift 7, the dynamic balancing aligns the lifting axis 25 vertically.

The dynamic balancing ensures a vertical alignment when the wheel axle 28 is horizontal. The deflection x is in a level perpendicular to the direction of the wheel axle 28. For an uneven floor 19 or inclined floor 19, the wheel axle 28 may be inclined to the horizontal plane ([0023]). The inclination 36 of the wheel axle 28 translates into a similar inclination of the lifting mechanism 7. The inclination 36 is in a plane which is spanned by the wheel axle 28 and the vertical axis. The inclination of the wheel axle 28 cannot be directly compensated by the dynamic balancing.

For machining the ceiling 3, the inclination 36 is preferably also compensated. The exemplary controller 9 provides for triggering the inclination 36 when activating the lifting mode S3. The user or an external controller 9 will activate the lifting mode S3 when the tool guide 1 is positioned at the predetermined position 4. The compensation can also be triggered in another mode. For example, a specific mode for the compensation can be provided, which is triggered automatically or on request of the user, for example, when reaching the position 4.

The alignment therefore initially provides for setting the two wheels 27 to the same height. The tool guide 1 rotates about a vertical axis, which coincides, for example, with the working axis 18. The vertical axis denotes an axis which is perpendicular to the wheel axle 28 and extends substantially along the vertical axis. The tool guide 1 is preferably positioned so that the vertical axis passes through the predetermined position 4. The steering system 20 rotates the two wheels 27 at the same speed in the opposite direction 26. The tool guide 1 and the tool 11 thus remain at the same position 4. The compact design with the small footprint typically allows this rotation even in confined spaces. The rotation takes place until the inclination 36 of the wheel axle 28 is equal to zero. Since the tool guide 1 touches the bottom with 19 only two wheels 27, there are for each position 4 at least one position in which all wheels 27 are at the same height. A inclination sensor 37 can detect the inclination of the wheel axle 28 with respect to the horizontal plane. The inclination sensor 37 can be implemented, for example, by the center of gravity sensor 34 or analogously. The steering system 20 balances the lifting mechanism 7 in the vertical lateral direction 26 of the wheel axle 28. The torque on the two wheels 27 acts in the same direction 26 and is typically the same size.

The steering system 20 includes, for example, a console 10 with input elements for driving direction and speed. An exemplary console 10 is based on a two-axis joystick. Other consoles may include, for example, a steering wheel for the direction of travel and a slider for the speed. The console 10 is preferably removable from the tool guide 1. A transmission of the control signals generated by the console 10 to the drive 21 is radio-based, optical or cable-based. The steering system 20 can detect a pushing or pulling force exerted by the user on the chassis 8. Under the action of the force, the chassis 8 tilts in the direction 26 of the pushing or pulling force. The steering system 20 detects the deflection x of the chassis 8. A speed of the chassis 8, for example, may be proportional to the deflection x.

The exemplary lifting mechanism 7 is based on a linear rail guide 38. Two parallel rails 39 are fastened on the chassis 8. The two profile rails 39 define the lifting axis 25. A rotor 40 engages in the two rails 39. The rotor 40 is displaceable on the profile rails 39 along the lifting axis 25. An electric motor 41 and a spindle 42 form the propulsion unit 24 for the rotor 40. The spindle 42 is rotatably mounted between the two profile rails 39. The rotor 40 has a thread 43 engaging into the spindle 42. The electric motor 41 rotates the spindle 42 about its longitudinal axis; the thread 43 converts the rotary motion into a movement along the lift axis 25. The illustrated lifting mechanism 7 is an example of a telescopic lift. Instead of or in addition to rails and runners 40, nested tubes can be used in the same way. Another propulsion unit 24 is based on a rack and pinion driven by the motor. Alternatively, a hydraulic or pneumatic press may lift the lifting mechanism 7.

The exemplary lifting mechanism 7 may include a manually telescopable platform 44 in addition to the power-driven lifting mechanism 7. The platform 44 can be constructed to be comparatively compact. The power-driven section can be brought to a basic height by means of the platform. The platform 44 may have one or more stages. The exemplary platform 44 is based on a rail guide, An exemplary mounting 5 has a tub-like shell 45 with a tensioning belt 46. The handle 16 can be positioned in the shell 45 and can be fixed with the tensioning belt 46 in the shell 45. With a second tensioning belt 47, the housing of the power tool 6 can be lashed to the mounting 5. The mounting 5 is preferably displaceable perpendicular to the lifting axis 25. The mounting 5, may be displaceable, for example, on a dovetail guide 48. The user can position the working axis 18 vertical to the wheel axle 28. The mounting 5 may include an angle adjustment, which allows a precise alignment of the working axis 18 parallel to the lifting axis 25. The angle adjustment includes, for example, a joint and a set screw.

The lifting mechanism 7 is preferably equipped with a sensor 49 for determining the contact pressure on the ceiling 3. For example, the mounting 5 is supported in the vertical direction 26 on a spring 50. The contact force presses the spring 50 together. A displacement sensor 51, e.g., a slide potentiometer, determines the distance by which the spring 50 is compressed. With a known spring constant, the sensor 49 determines the contact pressure. Other sensors for determining the contact force may be based on piezoelectric effects, stretch marks, etc. Other embodiments indirectly determine the contact pressure. For example, the sensor 49 includes an evaluation of the power consumption, e.g., the current consumption, of the propulsion unit 24. A correlation of the power consumption and a measure of the contact pressure force are stored in a table in the sensor. The first pressing of the tool 11 to the ceiling 3 is detected by the sensor 49 as a jump in the contact pressure. The sensor 49 reports to the control station 22 in a control signal that the tool 11 bears against the ceiling 3. The control station 22 can responsively stop a manual control of the lifting mechanism 7 and change to the machining mode. In a preferred variant, a target value for the pressing force is stored in the control station 22. The setpoint can be previously entered or selected by the user. The setpoint is dependent on the tool 11, e.g., a diameter of the drill. The propulsion unit 24 is adjusted to a constant contact force. The sensor 49 can provide a measured value for the contact force as part of a protection circuit 52. The protection circuit stops 52 a lifting of the lifting mechanism 7 if the measured value exceeds a threshold value.

In one embodiment, the tool guide 1 may suspend dynamic balancing when the tool 11 touches the ceiling 3. With the contact point on the ceiling 3, the tool guide 1 can remain static. The tool guide 1 can change to a stop mode S5, in which the wheels 27 are blocked by a brake 53 ([0025]). The balancing and the associated slight oscillating movement stops.

The tool guide 1 has a (contact) sensor 54 which detects a contact with the ceiling 3. Typically, the tool 11 consumables or the hand-held machine tool 6 touches the ceiling 3. The mounting 5 indirectly touches the ceiling 3. The contact sensor 54 outputs a (contact) signal to the controller 9, in which it is coded whether the tool 11 is in contact with the ceiling 3. The contact sensor 54 can evaluate, for example, the contact pressure of the lifting mechanism 7 or a measure of the contact pressure. The contact sensor 54 reports a contact when the contact pressure exceeds a threshold value or a rate of change of the contact pressure exceeds a threshold value. The threshold value is preferably dimensioned such that the associated contact pressure force is sufficient to keep the tool guide 1 in a static stable state via the two wheels 27 and the contact point on the ceiling 3. The contact sensor 54 may be realized for example by the sensor 49 or an analog sensor 49.

The controller 9 preferably suspends the balancing of the chassis 8 in case a contact signal is present. The controller 9 can delay the suspension until the contact signal is present for a minimum period. When the contact signal is present, the steering system 20 checks whether the lifting mechanism 7 is vertically aligned. If the steering system 20 detects a deviation from the vertical orientation, it lowers the lifting mechanism 7 in response to the control station 22. The lowering can be done by a given stroke, for example 1 cm. Alternatively, the stroke may be determined based on the deviation from the vertical orientation and/or the height of the lifting mechanism 7. For example, the stroke is proportional to the product of the deviation in an angular dimension and the current height of the lifting mechanism 7. The tool 11 detaches from the ceiling 3. As a result, the contact sensor 54 no longer contacts the ceiling 3. The controller 9 immediately activates balancing again by means of the steering system 20. The steering system 20 aligns the lifting mechanism 7 vertically. The controller 9 may iteratively repeat the process described in the paragraph until the lifting mechanism 7 is vertically aligned. Subsequently, the controller 9 at least preferably raises the lifting mechanism 7 until a contact signal is applied. The tool guide 1 is now aligned vertically.

The chassis 8 preferably has a brake 53. The brake 53 is preferably activated as soon as the tool guide 1 is vertically aligned and the contact signal is applied. The brake 53 is a parking brake, which permanently blocks the wheels 27 of the chassis 8. The brake 53 is realized for example as an engine brake. The brake 53 generates an electromagnetic force that counteracts a movement of the wheels 27. The brake 53 may be passive. The electric motors 29 may generate an electric current in the stator 31 according to a generator principle, when the rotor 30 is rotated. Examples of the electric motors 29 with the generator principle are DC motors, universal motors, etc. The regeneratively generated current is short-circuited by the brake 53 via a load resistor. The retroactive magnetic field counteracts the rotational movement of the rotor 30. Alternatively, a speed sensor or motion sensor can detect movement. The steering system 20 determines a corresponding control signal to counter-steer the propulsion 24 of the movement. The brake 53 can also be realized by a mechanical brake in the chassis 8, for example a disc brake, drum brake. The mechanical brake 53 can support the engine brake.

The tool guide 1 has one or several batteries 32 55. The batteries 55 supply the steering system 20, the control station 22, the electric motors 29 of the drive 21, the electric motor 41, of the propulsion unit 24 and possibly the hand-held machine tool 6 with electricity. The batteries 55 may include a stationary battery 32 and one or more removable batteries 55. The stationary battery 32 is preferably integrated in the chassis 8. The tool guide 1 has corresponding electromechanical interfaces for the removable batteries 55. The interfaces correspond, for example, to the interfaces of hand-held machine tools 6. The user can replace discharged batteries 55 with charged batteries 55 and charge the discharged batteries 55 in a separate charging station. The power consumption of the hand-held machine tool 6 is typically well over 200 watts. A correspondingly large capacity must be provided by the batteries. The stationary battery 32 is electrically connected to the other batteries 55. A charge controller 56 charges the stationary battery 32 with the other batteries 55. The charge control 56 preferably holds a charge level of the stationary battery 32 above an emergency level. The user can remove the other batteries 55 without danger. The stationary battery 32 has, due to the emergency level, a sufficient charge level to balance the chassis 8 for at least 10 minutes, preferably at least half an hour.

The tool guide 1 falls into an (emergency) mode S9 when the battery level 32 55 falls below the emergency level. The emergency mode ensures a secure position of the tool guide 1. The chassis 8 and the steering system 20 are supplied with power. The user can drive the tool guide 1 to a charging station or another desired location. Other consumers are preferably disabled, in particular the lifting mechanism 7 and the hand-held machine tool 6 are disabled. For example, the control station 22 may be locked for input by the user. The user can no longer lift the control station 22. The hand-held machine tool 6 can be separated by means of a switch from the batteries. The lifting mechanism 7 can be retracted automatically in the emergency mode to the lowest height. The tool guide 1 may indicate the emergency mode visually or acoustically in the emergency mode.

The invention claimed is:

1. A self-aligning tool guide with a hand-held machine tool, comprising:
   a mounting, wherein the hand-held machine tool is fixed in the mounting, wherein the hand-held machine tool is a power tool, and wherein a ceiling is machinable by the power tool;
   a lifting mechanism on which the mounting is mounted and wherein the lifting mechanism has a propulsion unit for lifting the mounting parallel to a lifting axis;
   a self-balancing chassis which has two wheels on a wheel axle, a drive coupled with the two wheels, and a steering system, wherein the lifting mechanism is mounted on the self-balancing chassis;
   a center of gravity sensor for detecting a lateral deflection of a center of gravity of the lifting mechanism relative to the wheel axle, wherein the steering system is configured to control the drive to output a torque that counteracts the lateral deflection;
   a contact sensor, wherein the contact sensor detects a contact force of the mounting which acts in a direction of gravity; and
   a control station, wherein the control station controls the propulsion unit depending on a detected contact pressure.

2. The self-aligning tool guide according to claim 1, wherein the self-aligning tool guide has exactly two wheels.

3. The self-aligning tool guide according to claim 1, wherein the lifting mechanism is pivotable about the wheel axle.

4. The self-aligning tool guide according to claim 1, wherein the steering system has a stationary mode in which the steering system is configured to balance the center of gravity via the drive.

5. The self-aligning tool guide according to claim 1, wherein the steering system is configured to vertically align the lifting axis via the drive.

6. The self-aligning tool guide according to claim 1, wherein the lifting mechanism is coupled with a stator of the drive.

7. The self-aligning tool guide according to claim 1, wherein the mounting is configured to arrange a working axis of the hand-held machine tool that is fixed in the mounting perpendicular to the wheel axle.

8. The self-aligning tool guide according to claim 1, wherein the mounting is displaceable transversely to the lifting axis.

9. The self-aligning tool guide according to claim 1, wherein the lifting mechanism is limited to a single-axis, translational movement along the lifting axis.

10. A control method for a self-aligning tool guide with a hand-held machine tool, wherein the self-aligning tool guide comprises:
    a mounting, wherein the hand-held machine tool is fixed in the mounting, wherein the hand-held machine tool is a power tool, and wherein a ceiling is machinable by the power tool;
    a lifting mechanism on which the mounting is mounted and wherein the lifting mechanism has a propulsion unit for lifting the mounting parallel to a lifting axis;
    a self-balancing chassis which has two wheels on a wheel axle, a drive coupled with the two wheels, and a steering system, wherein the lifting mechanism is mounted on the self-balancing chassis;
    a center of gravity sensor for detecting a lateral deflection of a center of gravity of the lifting mechanism relative to the wheel axle, wherein the steering system is configured to control the drive to output a torque that counteracts the lateral deflection;
    a contact sensor, wherein the contact sensor detects a contact force of the mounting which acts in a direction of gravity; and
    a control station, wherein the control station controls the propulsion unit depending on a detected contact pressure;
    and the control method comprising the steps of:
    detecting the lateral deflection of the center of gravity of the lifting mechanism relative to the wheel axle of the self-aligning tool guide;
    actuating the drive such that the drive outputs a torque that counteracts the lateral deflection;
    detecting a contact force of the mounting which acts in the direction of gravity by the contact sensor; and
    controling the propulsion unit by the control station depending on the detected contact pressure.

* * * * *